United States Patent
Kim

(10) Patent No.: US 10,393,200 B2
(45) Date of Patent: Aug. 27, 2019

(54) ELECTRIC CALIPER BRAKE

(71) Applicant: MANDO CORPORATION, Pyeongtaek-si, Gyeonggi-do (KR)

(72) Inventor: Kyung-Won Kim, Seongnam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 15/832,535

(22) Filed: Dec. 5, 2017

(65) Prior Publication Data
US 2018/0094683 A1 Apr. 5, 2018

Related U.S. Application Data

(63) Continuation-in-part of application No. 15/615,533, filed on Jun. 6, 2017.

(30) Foreign Application Priority Data

Jun. 10, 2016 (KR) .................. 10-2016-0072467
Jun. 30, 2016 (KR) .................. 10-2016-0082539

(51) Int. Cl.
*F16D 125/40* (2012.01)
*F16D 65/18* (2006.01)
(Continued)

(52) U.S. Cl.
CPC ............ *F16D 65/18* (2013.01); *B60T 13/586* (2013.01); *B60T 13/741* (2013.01);
(Continued)

(58) Field of Classification Search
CPC .... F16D 55/226; F16D 65/0068; F16D 65/18; F16D 65/183; F16D 2121/04;
(Continued)

(56) References Cited

U.S. PATENT DOCUMENTS

| 7,779,971 B2 | 8/2010 | Adachi | |
| 8,061,491 B2 * | 11/2011 | Tristano | B60T 13/745 188/265 |
| 8,322,495 B2 * | 12/2012 | Leiter | B60T 7/107 188/72.6 |
| 9,528,563 B2 * | 12/2016 | Balz | F16D 65/18 |

(Continued)

FOREIGN PATENT DOCUMENTS

| CN | 107013614 A | 8/2017 |
| DE | 102011121765 A1 | 6/2013 |
| WO | 2007/051809 A1 | 5/2007 |

OTHER PUBLICATIONS

U.S. Non-Final Office Action dated May 17, 2018 issued in U.S. Appl. No. 15/615,533.

(Continued)

*Primary Examiner* — Thomas W Irvin
(74) *Attorney, Agent, or Firm* — Morgan, Lewis & Bockius LLP

(57) ABSTRACT

Disclosed herein is an electric caliper brake. The electric caliper brake which includes a carrier provided with a pair of pad plates movably with respect to a disk, and a caliper housing slidably installed on the carrier and provided with a cylinder in which a piston is movably provided by braking oil pressure, includes a spindle member which is installed to penetrate a rear portion of the cylinder and rotates by receiving a rotational force from an actuator, and a power converting unit including a nut member which is screwed with the spindle member and is disposed in the piston, moves forward and backward in accordance with the rotation of the spindle member so as to press the piston; a filling member coupled to the nut member in the piston; and an anti-rotation surface provided on at least one plane on an outer circumferential surface of the filling member so that (Continued)

the filling member is coupled to the piston in a limited rotation state.

11 Claims, 10 Drawing Sheets

(51) Int. Cl.
*F16D 65/00* (2006.01)
*F16D 55/226* (2006.01)
*B60T 13/58* (2006.01)
*B60T 13/74* (2006.01)
*F16H 25/20* (2006.01)
*F16D 121/04* (2012.01)
*F16D 121/24* (2012.01)

(52) U.S. Cl.
CPC ....... *F16D 55/226* (2013.01); *F16D 65/0068* (2013.01); *F16D 65/183* (2013.01); *F16H 25/2018* (2013.01); *F16D 2121/04* (2013.01); *F16D 2121/24* (2013.01); *F16D 2125/40* (2013.01)

(58) Field of Classification Search
CPC ............. F16D 2121/24; F16D 2125/40; F16H 25/2018; B60T 13/741
USPC ...................................................... 188/72.8
See application file for complete search history.

(56) References Cited

U.S. PATENT DOCUMENTS

| | | | |
|---|---|---|---|
| 9,593,728 | B2 | 3/2017 | DeMorais et al. |
| 9,732,812 | B2 * | 8/2017 | Giering .................. F16D 65/14 |
| 9,874,257 | B2 | 1/2018 | Son et al. |
| 9,964,165 | B2 | 5/2018 | Chelaidite et al. |
| 2009/0211858 | A1 | 8/2009 | Leiter et al. |
| 2011/0132188 | A1 | 6/2011 | Winkler et al. |
| 2014/0158480 | A1 | 6/2014 | Qian et al. |
| 2015/0240923 | A1 | 8/2015 | Baukholt et al. |
| 2017/0261053 | A1 | 9/2017 | Schaefer et al. |
| 2017/0356514 | A1 * | 12/2017 | Kim ...................... B60T 13/586 |
| 2018/0094683 | A1 | 4/2018 | Kim |
| 2018/0148030 | A1 * | 5/2018 | Kim ........................ B60T 1/065 |

OTHER PUBLICATIONS

U.S. Office Action dated Sep. 18, 2018 issued in U.S. Appl. No. 15/615,533.
Office Action issued in corresponding Chinese Patent Application No. 201710431248.7 dated Oct. 12, 2018 (with Korean Translation).

* cited by examiner

ELECTRIC CALIPER BRAKE

CROSS-REFERENCE TO RELATED APPLICATION(S)

This application is a Continuation-In-Part of U.S. patent application Ser. No. 15/615,533 which claims priority to and the benefit of Korean Patent Application No. P2016-0072467, filed on Jun. 10, 2016 and P2016-0082539, filed on Jun. 30, 2016 in the Korean Intellectual Property Office, the disclosures of which are incorporated by reference in their entireties.

BACKGROUND

1. Technical Field

The present disclosure relates to an electric caliper brake, and more particularly, to an electric caliper brake capable of simplifying a structure and improving operating efficiency.

2. Description of the Related Art

In general, an electric caliper brake is a device obtained by incorporating conventional hydraulic disk brakes into actuators that are electrically operated.

Korean Patent Publication No. 10-2011-0124817 discloses an example of such an electric disk brake (hereinafter, referred to as an electric caliper brake). According to the disclosed document, the electric caliper brake includes a disk rotating together with a wheel of the vehicle, a carrier provided with a pair of pad plates for pressing the disk so as to be able to move forward and backward, a caliper housing slidably installed on the carrier and provided with a cylinder in which a piston can be advanced and retracted by braking hydraulic pressure, a spindle pressing the piston, and a motor and a speed reducer for an actuator for transmitting a rotational force to the spindle.

The electric caliper brake performs a parking function by applying a braking action by pressing the piston according to the braking hydraulic pressure, or by receiving a rotational force generated from the motor and pressing the piston by a spindle which converts rotational motion into linear motion.

Meanwhile, the electric caliper brake is normally required to be provided on the piston in a state in which the rotation of the spindle is restricted in order to convert the rotational force of the motor into a linear motion. For this purpose, since a head portion of the conventional spindle, which presses the piston, has a protrusion portion for restricting the rotation, the weight of the spindle increases. In particular, since the conventional spindle is formed of a steel material, the increased weight exerts a large load on the caliper housing, adversely affecting the fuel economy of the vehicle. Further, since the protrusion portion must be formed through a cutting process, there is a problem that processing is difficult.

In addition, in the conventional electric caliper brake, the stroke (pedal travel distance) of the brake pedal is varied according to the required fluid amount of the brake oil transmitted to the cylinder during a braking operation. For example, in order to improve the braking feeling during a braking operation, the required fluid amount of the brake oil must be reduced. However, in the conventional electric caliper brake, there is a predetermined space between the piston and the spindle, for example, in a cylinder receiving a braking oil pressure, which increases the required amount of brake oil for braking, thereby reducing the feeling of braking.

The spindle of the conventional electric caliper brake also includes a nut member and a spindle member that are screwed together to press the piston. The nut member contacts the piston and the spindle member is coupled to the motor so that the rotational force of the motor is transmitted to the piston.

More specifically, when power is applied to the motor, the spindle member rotates in the forward/reverse direction to move the nut member forward and backward. At this time, a stuck occurs when the nut member is excessively close to the spindle member. This problem is caused by the retraction of the nut member up to the threaded portion of the spindle member or by the clearance or wear of the manufacturing process. To prevent this, a stopper is provided on the opposite surface of the spindle member and the nut member and blocks over-release of the nut member. However, occasionally, the stopper does not operate normally when the thread dimension is unstable or the stopper is damaged due to abrasion or impact.

(Patent Document 1) Patent Laid-Open Publication No. 10-2011-0124817 (2011 Nov. 18)

(Patent Document 2) Patent Registered No. 10-1220294 (2013 Jan. 3)

SUMMARY

Therefore, it is an aspect of the present disclosure to provide an electric caliper brake which enhances the operating efficiency.

It is another aspect of the present disclosure to provide an electric caliper brake which simplifies the structure to make the weight lighter.

It is another aspect of the present disclosure to provide an electric caliper brake which reduces the required amount of brake oil to improve the feeling of braking.

It is another aspect of the present disclosure to provide an electric caliper brake which solves the unsafe stopper operation of the spindle.

Additional aspects of the disclosure will be set forth in part in the description which follows and, in part, will be obvious from the description, or may be learned by practice of the disclosure.

In accordance with one aspect of the present disclosure, an electric caliper brake which includes a carrier provided with a pair of pad plates movably with respect to a disk, and a caliper housing slidably installed on the carrier and provided with a cylinder in which a piston is movably provided by braking oil pressure, includes a spindle member which is installed to penetrate a rear portion of the cylinder and rotates by receiving a rotational force from an actuator, and a power converting unit including a nut member which is screwed with the spindle member and is disposed in the piston, moves forward and backward in accordance with the rotation of the spindle member so as to press the piston; a filling member coupled to the nut member in the piston; and an anti-rotation surface provided on at least one plane on an outer circumferential surface of the filling member so that the filling member is coupled to the piston in a limited rotation state.

The nut member may include a rod portion provided with thread for screwing to the spindle member and a head portion extending radially from the rod portion, the filling member may be integrally formed with the nut member, and at least one rotation preventing portion having a plane surface may be formed on an inner circumferential surface of the piston, and the head portion may be formed so as not to be in contact with the rotation preventing portion.

The filling member may be formed to be in close contact with the rear side of the head portion to enclose the rod portion.

The anti-rotation surface may be in surface contact with the rotation preventing portions having a plane surface formed on an inner circumferential surface of the piston.

The filling member may be formed of aluminum or a plastic material.

The outer diameter of the head portion may be provided to be smaller than the outer diameter of the filling member.

The filling member may be formed of an incompressible material.

The nut member further includes a head portion that is in contact with the piston, and a nut rod portion extending from the head portion and is threaded on an inner circumferential surface to be screwed with the spindle member, and the filling member may have a hollow portion at its center and the nut rod portion may be coupled to the hollow portion.

The electric caliper brake further includes a stopper projection provided on a spindle member facing the nut member, a stepped portion provided on the nut member so as to be engaged with the stopper projection when the stopper projection is rotated, and a backup protrusion provided on the filling member so as to be engaged with the stopper projection when the stopper projection is rotated.

The stepped portion and the backup protrusion facing the stopper projection may be disposed at different angles so as to be engaged with each other when the stopper projection is rotated.

The height of the backup protrusion protruding from the filling member may be provided to be the same as the height of the stepped portion protruding from the nut member.

The filling member may include at least one slit formed in a radial direction.

In accordance with another aspect of the present disclosure, an electric caliper brake, which includes a carrier provided with a pair of pad plates movably with respect to a disk, and a caliper housing slidably installed on the carrier and provided with a cylinder in which a piston is movably provided by braking oil pressure, includes a spindle member which is installed to penetrate a rear portion of the cylinder and rotates by receiving a rotational force from an actuator, and a power converting unit including a nut member which is screwed with the spindle member and is disposed in the piston, moves forward and backward in accordance with the rotation of the spindle member so as to press the piston; and a filling member coupled to the nut member in the piston, wherein a plurality of first slots for discharging air present in the cylinder may be provided on the outer surface of the filling member.

The nut member further includes a head portion that is in contact with the piston, and a nut rod portion that extends from the head portion and is threaded on an inner circumferential surface to be screwed with the spindle member, and a plurality of second slots extending in a direction parallel to the axial direction of the piston to discharge air present in the cylinder may be provided on the outer surface of the head portion.

At least one anti-rotation protrusion may be provided on the inner circumferential surface of the piston so as to be able to be inserted into the first slots and the second slots.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, the embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. For the sake of clarity, the drawings are not drawn to scale, and the size of the components may be slightly exaggerated to facilitate understanding.

Figure 1:
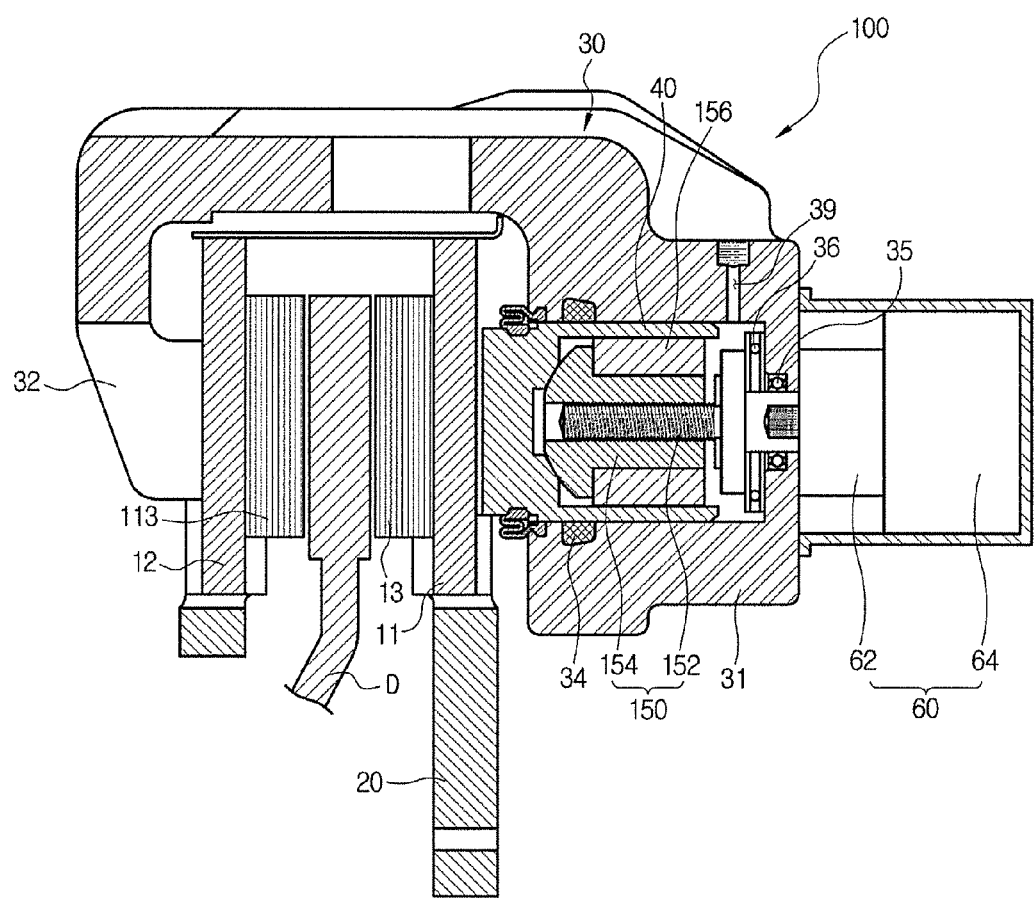
FIG. 1 is a cross-sectional view schematically showing an electric caliper brake according to an embodiment of the present disclosure.
Figure 2:
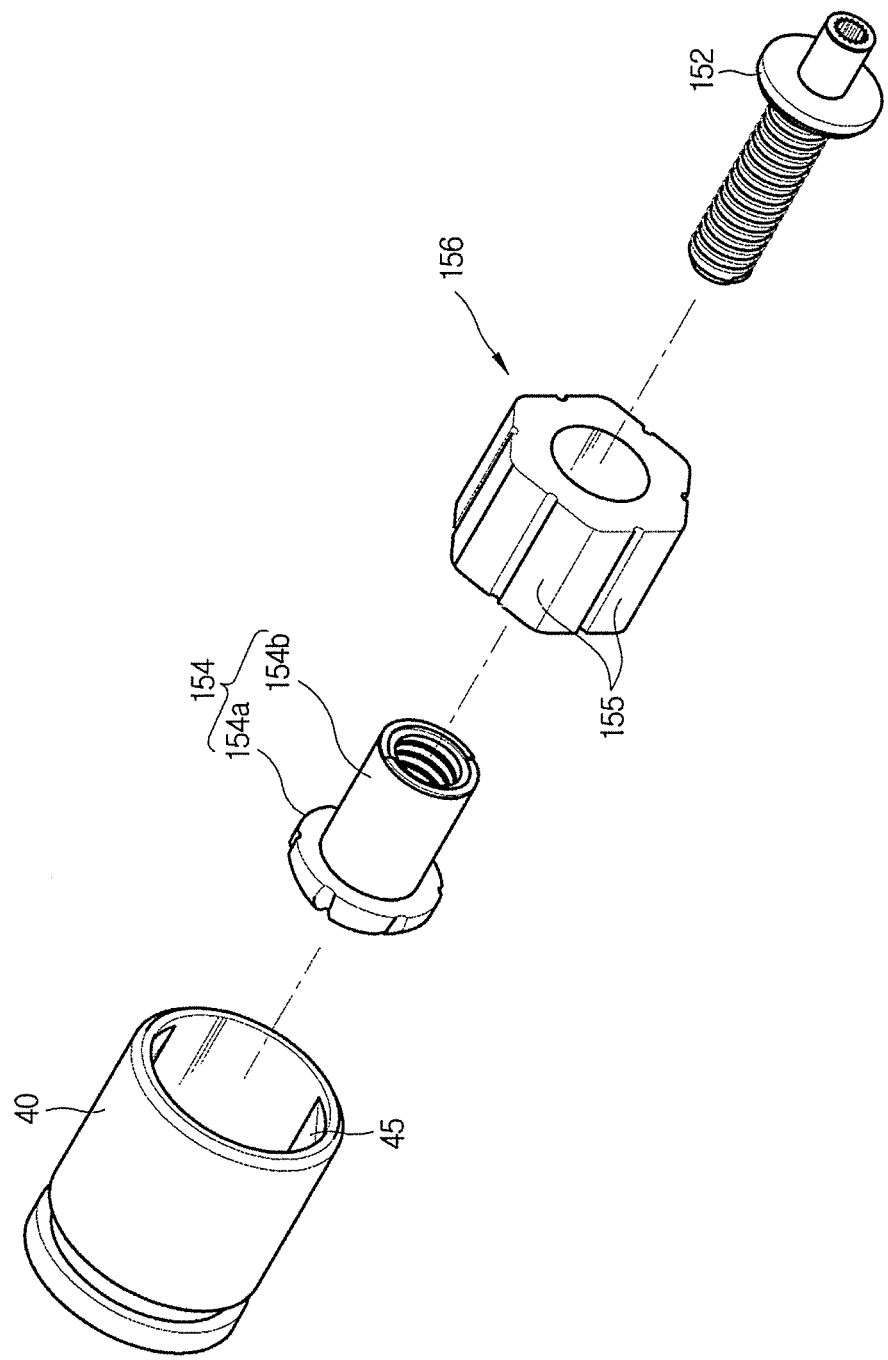
FIG. 2 is an exploded perspective view showing a combined state of a piston and a power converting unit and an anti-rotation member provided in the electric caliper brake according to the embodiment of the present disclosure.

FIG. 1 is a cross-sectional view schematically showing an electric caliper brake according to an embodiment of the present disclosure, and FIG. 2 is an exploded perspective view showing a combined state of a piston, a power converting unit, and an anti-rotation member provided in the electric caliper brake.

As shown in FIGS. 1 and 2, an electric caliper brake 100 according to the present embodiment includes a carrier 20 provided with a pair of pad plates 11 and 12 for pressing a disk D rotating together with a wheel (not shown) of a vehicle, a caliper housing 30 slidably installed on the carrier 20 and provided with a cylinder 31 in which a piston 40 can be advanced and retracted by braking hydraulic pressure, a power converting unit 150 pressing the piston 40, an anti-rotation member 156 provided to limit the rotation of a nut member 154 of the power converting unit 150, and an actuator 60 for transmitting a rotational force to the power converting unit 150.

The pair of pad plates 11 and 12 include an inner pad plate 11 disposed to be in contact with the piston 40 and an outer pad plate 12 disposed to be in contact with finger portion 32 of the caliper housing 30. The pair of pad plates 11 and 12 are provided on the carrier 20 fixed to the vehicle body so as to be able to move back and forth toward opposite sides of the disk D. A friction pad 13 is attached to one surface of each of the pad plates 11 and 12 facing the disk D.

The caliper housing 30 is slidably installed on the carrier 20. More specifically, the caliper housing 30 includes the cylinder 31 in which the piston 40 is provided so as to move forward and backward and the power converting unit 150 is installed at the rear portion thereof, and the finger portion 32 bent in a downward direction from a front portion so as to operate the outer pad plate 12. The finger portion 32 and the cylinder 31 may be integrally formed.

The piston 40 is provided in a cylindrically with a cup-shaped hollow portion and is slidably inserted into the cylinder 31. The power converting unit 150 penetrates a side wall of the cylinder and connects to the actuator 60 provided in the rear of the cylinder. At least one rotation preventing portion 45 provided in a planar shape is formed on an inner circumferential surface of the piston 40, which will be described later.

The piston 40 presses the inner pad plate 11 toward the disk D by the axial force of the power converting unit 150 which receives the rotational force of the actuator 60. That is, when oil pressure for braking is applied to the inside of the cylinder 31, the piston 40 advances toward the inner pad plate 11 to press the inner pad plate 11 and the caliper housing 30 is operated in the direction opposite to the piston 40 by the reaction force so that the finger portion 32 presses the outer pad plate 12 toward the disk D to perform the braking.

Meanwhile, the caliper housing 30 is provided with an oil port 39 through which brake oil is introduced so that hydraulic pressure for braking can be applied to the inside of the cylinder 31 and a sealing member 34 for preventing the leakage of oil is provided between the outer surface of the piston 40 and the inner surface of the cylinder 31. The sealing member 34 serves to prevent leakage of the brake oil flowing into the cylinder 31 and to return the piston 40 to its original position upon releasing the braking action.

The power converting unit 150 receives the rotational force from the actuator 60 composed of a motor 64 and a speed reducer 62 and presses the piston 40 toward the inner pad plate 11. The speed reducer 62 is a publicly known technique and thus a description thereof will be omitted.

The power converting unit 150 includes the nut member 154 that is disposed in the piston 40 and contacts the back side of the piston 40 and a spindle member 152 that is screwed with the nut member 154.

One side of the spindle member 152 is rotatably installed through the caliper housing 30, that is, the cylinder 31, and the other side of the spindle member 152 is disposed in the piston 40. One side of the spindle member 152 passing through the cylinder 31 is connected to the speed reducer 62 to receive the rotational force of the motor 64, and a male thread is formed on the outer circumferential surface of the other side.

A first bearing 35 and a second bearing 36 are installed in the cylinder 31 at positions spaced apart from each other in order to stably support the spindle member 152. The second bearing 36 is a thrust bearing, and receives a reaction force transmitted through the spindle member 152 as the nut member 154 moves back and forth during the braking operation.

The nut member 154 has a head portion 154a which contacts the back side of the piston 40 for pressing the piston 40 and a rod portion 154b which extends from a head portion 154a and is provided with thread on the inner circumferential surface thereof for screwing to the spindle member 152. The head portion 154a and the rod portion 154b are integrally formed.

The nut member 154 is screwed to the spindle member 152 to move back and forth along the rotational direction of the spindle member 152 and serves to press and release the piston 40. Accordingly, the nut member 154 should be provided in a limited rotation state in order to linearly move in accordance with the rotation of the spindle member 152. The anti-rotation member 156 according to the present embodiment is integrally provided with the nut member 154 and serves to limit the rotation of the nut member 154.

More specifically, in order to realize a lightweight product, the anti-rotation member 156 may be made of aluminum or plastic, which is lighter in weight than steel and formed integrally with the nut member 154 by insert injection molding.

In contrast, the nut member 154 is made of a material such as steel having high rigidity so as to receive the power transmitted from the spindle member 152 and to press the piston 40 stably and effectively and the anti-rotation member 156 is made of aluminum or plastic to reduce the weight of the product so that the nut member 154 and the anti-rotation member 156 may be separately provided and coupled to each other. That is, since the steel constituting the nut member 154 has a problem of hindering a lightweight of the product due to its heavy weight, the anti-rotation member 156 is provided to be made of a material such as aluminum or plastic that is light in weight and to have an outer diameter larger than the head portion 154a of the nut member 154 so that the volume of the anti-rotation member 156 occupying the inside of the piston 40 is maximized, which results in effectively realizing a lightweight of the product.

Figure 3:
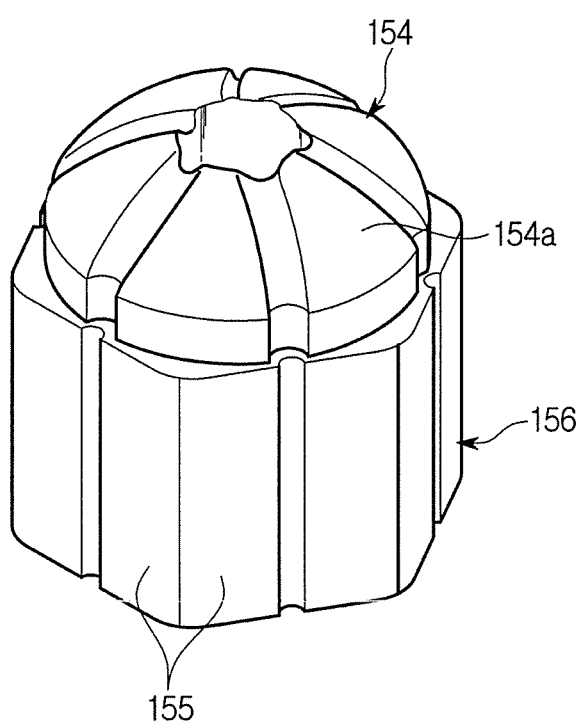
FIG. 3 is a perspective view showing a state in which the anti-rotation member of FIG. 2 is integrally provided on a nut member by insert injection.
Figure 4:
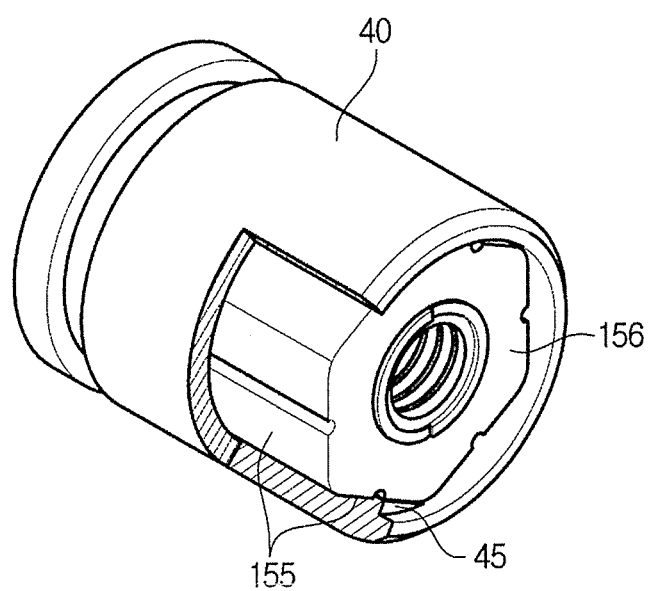
FIG. 4 is a partially cutaway perspective view showing a state in which the rotation of the nut member formed with the anti-rotation member of FIG. 3 is coupled to the piston.

As shown in FIG. 3, the anti-rotation member 156 is formed to be in close contact with the rear side of the head portion 154a to enclose the rod portion 154b. The anti-rotation member 156 is provided with an anti-rotation surface 155 having at least one plane on the outer circumferential surface so that rotation is restricted. As shown in FIG. 4, the anti-rotation surface 155 is restricted in rotation by the rotation preventing portions 45 formed on the inner circumferential surface of the piston 40. The rotation preventing portions 45 formed on the piston 40 is formed to have a plane corresponding to the anti-rotation surface 155 formed on the outer circumferential surface of the anti-rotation member 156.

The anti-rotation member 156 is formed to have a hexagonal shape and the inner circumferential surface of the piston 40 is formed with two rotation preventing portions 45. However, the present disclosure is not limited thereto, the number of the anti-rotation surfaces 155 formed on the outer circumferential surface of the anti-rotation member 156 and the number of the rotation preventing portions 45 of the piston 40 can be increased or decreased.

Meanwhile, the head portion 154a of the nut member 154 formed with the anti-rotation member 156 is provided so as not to come into contact with the rotation preventing portions 45. The head portion 154a of the present embodiment is formed such that the protrusion of the rotation preventing structure formed on the conventional head portion is removed, and the head portion 154a is formed to have a width smaller than the width (diameter) of the anti-rotation member 156. Therefore, the weight of the nut member 154 according to the present embodiment can be reduced compared with the conventional nut member having the protrusion portion in the head portion even when the nut member 154 includes the anti-rotation member 156. The nut member 154 is integrally formed with the anti-rotation member 156 and is inserted into the piston 40 and is restricted in rotation, thereby the nut member 154 can perform a linear motion when the spindle member 152 rotates.

In this embodiment, the anti-rotation member 156 is provided integrally with the nut member 154 to limit the rotation of the nut member 154. However, the present disclosure is not limited to this, it can also serve as a filling member for reducing the required fluid amount of the brake oil. The filling member will be described later.

FIGS. 5 to 9 illustrate an electric caliper brake according to another embodiment of the present disclosure. The present embodiment will be described mainly on the points different from the above embodiment, and the same reference numerals denote the same functions, and a detailed description thereof will be omitted.

Figure 5:
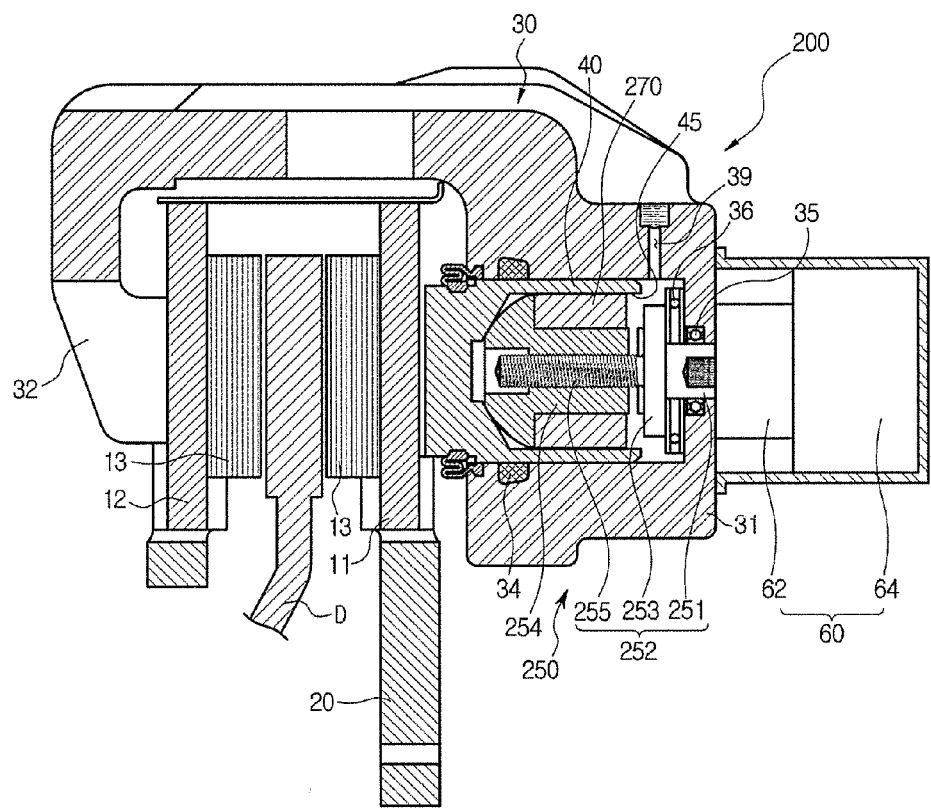
FIG. 5 is a schematic view of an electric caliper brake according to another embodiment of the present disclosure.
Figure 6:
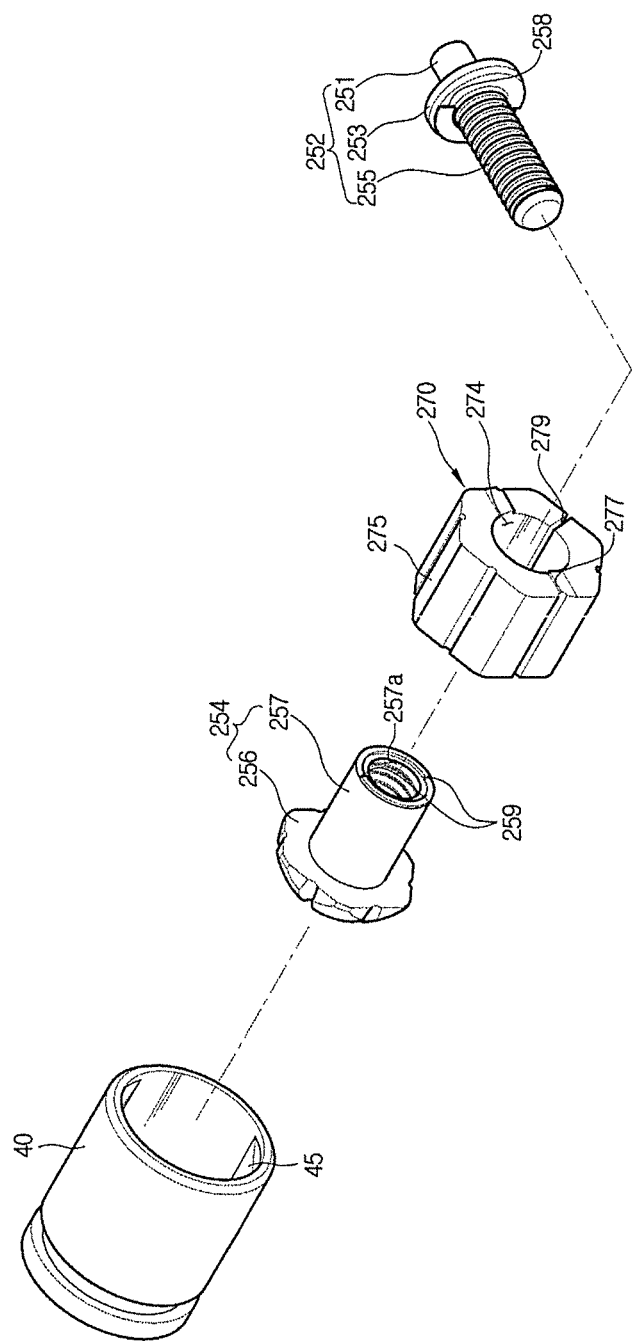
FIG. 6 is an exploded view of a piston, a power converting unit, and a filling member provided in an electric caliper brake according to another embodiment of the present disclosure.
Figure 7:
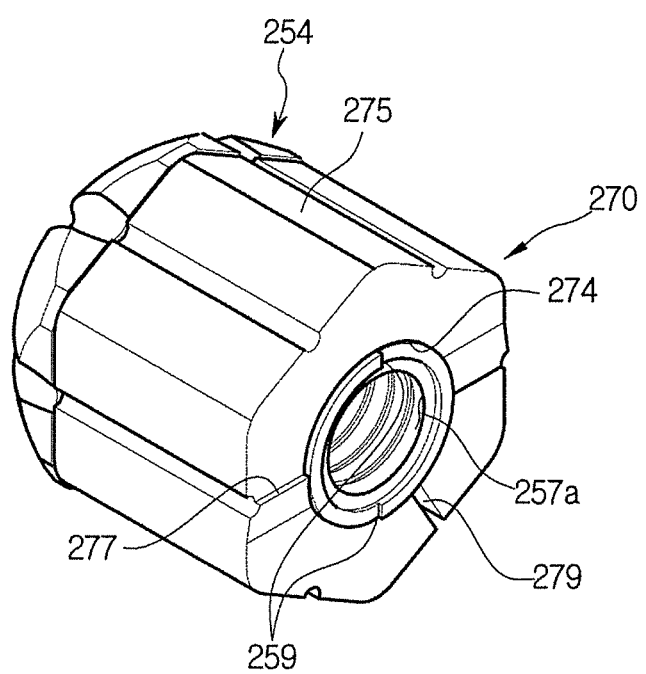
FIG. 7 is a view showing a state in which a power converting unit and a filling member are partly engaged with each other in an electric caliper brake according to another embodiment of the present disclosure.

FIG. 5 is a schematic view of an electric caliper brake according to the present embodiment, and FIGS. 6 and 7 are views showing a disassembly and engagement state of a part of an internal part provided in the electric caliper brake according to the present embodiment.

An electric caliper brake 200 according to the present embodiment includes a disk D rotating together with a wheel of a vehicle, a carrier provided with a pair of pad plates 11 and 12 for pressing the disk D so as to be able to move forward and backward, a caliper housing 30 slidably installed on the carrier 20 and provided with a cylinder 31 in which the piston 40 can be moved forward and backward by braking hydraulic pressure, a power converting unit 250 pressing the piston 40, and an actuator 60 for transmitting a rotational force to the power converting unit 250. The structure of the electric caliper brake above is the same as that of the embodiment.

According to the present embodiment, the power converting unit 250 includes a nut member 254 that is brought into contact with the inside of the piston 40 and a spindle member 252 that is screwed with the nut member 254.

As shown in FIGS. 5 and 6, the spindle member 252 includes a spindle body 251 having a large diameter part, a spindle flange 253 extending in the radial direction from the spindle body 251, and spindle rod 255 having a small-diameter part and a male thread formed on its outer circumferential surface.

The spindle body 251 passes through the sidewall of the cylinder 31 of the caliper housing 30 and is connected to the speed reducer 62 of the actuator 60. The spindle flange 253 and the spindle rod 255 are disposed in the piston 40. In order to stably support the spindle member 252, the first bearing 35 and the second bearing 36 are installed in the cylinder 31 at positions spaced apart from each other. The first bearing 35 is provided on the outer circumferential surface of the spindle body 251 and is rotatably supported on the sidewall of the cylinder. The second bearing 36 is provided between the spindle flange 253 and the sidewall of the cylinder and is rotatably support.

The nut member 254 has a head portion 256 which is in contact with the piston 40 and a nut rod portion 257 which extends from the head portion 256 and is formed with a female screw thread on the inner circumferential surface thereof so as to be screwed with the spindle member 252.

The head portion 256 and the nut rod portion 257 may be integrally formed and the nut rod portion 257 may be formed in a cylindrical shape having a smaller radius than the head portion 256. The size of the head portion 256 is provided so as to be substantially in contact with the inner circumferential surface of the cup-shaped hollow portion of the piston 40, and the nut rod portion 257 is formed so as to form a space between the inner circumferential surface of the piston 40 and the outer circumferential surface of the nut rod portion 257.

The nut rod portion 257 is provided with a through hole 257a at its center in the longitudinal direction so as to be screwed with the spindle member 252 and a female screw thread is formed on the inner circumferential surface of the through hole 257a. The female screw thread of the nut rod portion 257 is screwed with the male screw thread of the spindle member 252 so that the nut member 254 moves forward and backward in accordance with the rotating direction of the spindle member 252 and serves to press and release the piston 40.

Meanwhile, stoppers 258 and 259 are respectively provided for stable operation in the effective stroke of the power converting unit 250 between the spindle member 252 and the nut member 254. The stoppers include the stopper projection 258 provided on the spindle member 252 and the stepped portion 259 provided on the nut member 254 at mutually opposing positions to be engaged with each other when the stopper projection 258 is rotated.

The stopper projection 258 protrudes from the spindle flange 253 of the spindle member 252 facing the nut member 254. For example, the stopper projections 258 may be provided at two positions spaced 180 degrees apart from each other in the radial direction as shown in the drawing and the stopper projection 258 facing the stepped portion 259 can be machined into a surface shape in one direction (thickness direction of the spindle flange) so as to stably engage with each other during rotation.

The stepped portion 259 is provided at the end part of the nut rod portion 257 of the nut member 254 facing the spindle member 252. As shown in the drawing, the stepped portion 259 may be provided at two positions spaced 180 degrees apart from each other in the radial direction and the stepped portions 259 facing the stepped projections 258 can be machined into a surface shape in one direction (the longitudinal direction of the nut rod) so as to stably engage with each other during rotation.

When the spindle member 252 rotates clockwise, the nut member 254 rotates counterclockwise. At this time, the stopper projection 258 and the stepped portion 259 are close to each other and engaged, thus the braking is released. Also, when the spindle member 252 rotates counterclockwise, the nut member 254 rotates in the clockwise direction. At this time, when the piston 40 is pressed while the stopper projection 258 and the stepped portion 259 are separated from each other, the braking is performed. The effective stroke of the power conversion unit 250 refers to a distance moved by the nut member 254 from a position that the stopper projection 258 contacts the stepped portion 259 and to a position that the stopper projection 258 and the stepped portion 259 are moved away so that the disk D is pressed by the piston.

According to the present embodiment, the nut member 254 may further include a filling member 270 to reduce the required amount of brake oil for braking.

The filling member 270 is made of a lightweight material such as synthetic resin or aluminum and has a hollow portion 274 at its center and is coupled to the nut rod portion 257 of the nut member 254. The filling member 270 also includes an anti-rotation surface 275 having at least one plane on the outer circumferential surface so that the rotation is restricted when the spindle member 252 is operated. The rotation of the anti-rotation surface 275 is restricted by the rotation preventing portions 45 formed on the inner circumferential surface. As shown in the drawing, the filling member 270 is formed to have a hexagonal shape and the inner circumferential surface of the piston 40 is formed with two rotation preventing portions 45. The present disclosure is not limited to the embodiments shown herein but may be embodied in other forms. For example, the number of the anti-rotation surfaces 275 formed on the outer circumferential surface of the filling member 270 and the number of the rotation preventing portions 45 of the piston 40 may be increased or decreased if the rotation of the filling member 270 can be restricted.

Although not shown in detail, an anti-rotation surface having at least one plane corresponding to the anti-rotation surface 275 of the filling member 270 may be formed on the head portion 256 of the nut member 254. When the nut member 254 is coupled to the filling member 270 and inserted into the piston 40, the rotation of the nut member 254 is limited, thereby effectively converting the rotational motion of the spindle member 252 into a linear motion.

As described above, the filling member 270 is provided on the nut member 254 and is inserted into the piston 40 in a limited rotation state, thereby filling the space inside the piston 40. The brake oil introduced from the oil port 39 filling the inside of the piston 40 and pressurizes the piston 40 toward the disk D. At this time, since the inside of the piston 40 is filled with the filling member 270, the required fluid amount of the brake oil flowing into the cylinder 31 is reduced compared to the conventionally required fluid amount of the brake oil, so that the feeling of the pedal can be improved.

Figure 8:
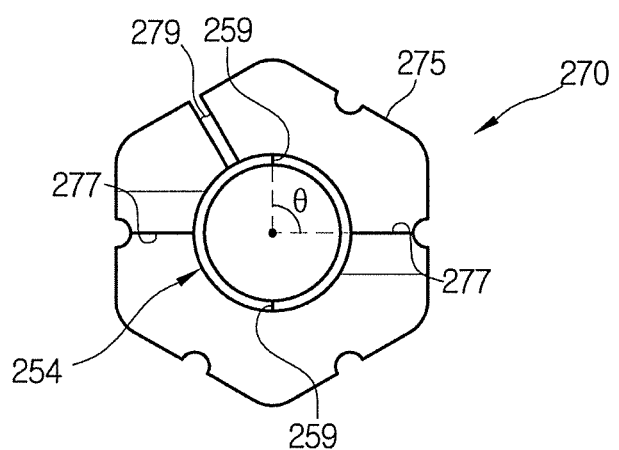
FIG. 8 is a plan view showing a coupling state of a power converting unit and a filling member provided in an electric caliper brake according to another embodiment of the present disclosure.

Meanwhile, as shown in FIGS. 7 and 8, the stepped portion 259 provided at the end part of the nut rod portion 257 having a small thickness cannot be engaged with the stopper projection 258 when the dimensions are unstably made or worn or broken, and there is a fear that the stopper may not operate and stuck may occur.

The filling member 270 of the present embodiment is provided with a backup protrusion 277 which is provided to be engaged with the stopper projection 258 of the spindle member 252 described above on the bottom surface corresponding to the spindle flange 253 of the spindle member 252.

The backup protrusion 277 is provided in a stepped shape on the end part of the filling member 270 like the stepped portion 259 of the nut member 254. At least one pair of backup protrusions 277 are spaced 180 degrees apart in the radial direction so as to be engaged by the stopper projection 258 of the spindle member 252. Further, the area of the backup protrusion 277 which is engaged with the stopper projection 258 is larger than the area of the stepped portion 259, and thus the stopper can be more accurately operated.

Figure 9:
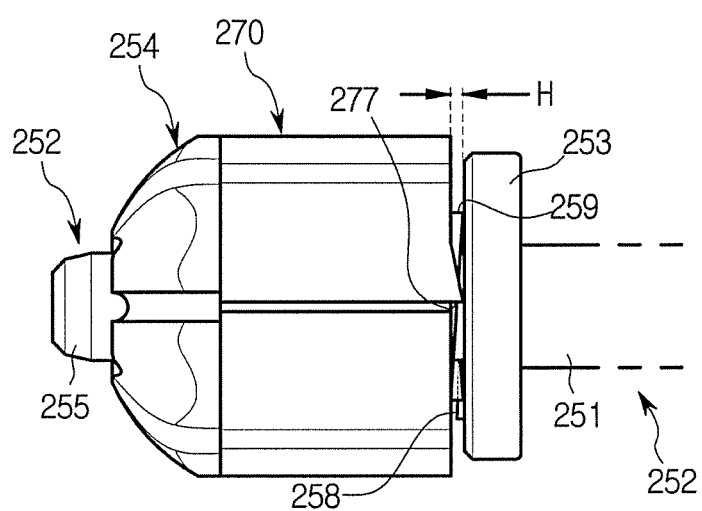
FIG. 9 is a side view showing a coupling state of a power converting unit and a filling member provided in an electric caliper brake according to another embodiment of the present disclosure.

The backup protrusions 277 may be disposed at different angles from the stepped portion 259 provided on the nut member 254. For example, as shown in FIG. 8 the stepped portion 259 and the backup protrusions 277 are disposed at 90-degree intervals as a whole, but the present disclosure is not limited to this, but may be arranged to be staggered at various other angles and thereby quickly engaged by the stopper projection 258. Since the nut member 254 has a structure in which the filling member 270 is coupled to the head portion 256, when the filling member 270 is rotated and bonded to the head portion 256, an appropriate arrangement angle can be easily set. As shown in FIG. 9, the height H of the backup protrusion 277 protruding from the bottom surface of the filling member 270 is equal to the height of the stepped portion 259 protruding from the bottom surface of the nut rod portion 257.

The electric caliper brake according to the present embodiment is configured such that the stepped portion 259 of the nut member 254 or the backup protrusion 277 of the filling member 270 is quickly and stably engaged by the stopper projection 258 of the spindle member 252 without departing from the effective stroke. Accordingly, the stopper of the power converting unit 250 can be normally operated even if a manufacturing clearance, breakage or abrasion occurs. In this case, the filling member 270 is made of an incompressible material, so that even when the backup protrusion 277 is engaged with the stopper projection 258, the filling member 270 is partially pressurized to prevent a risk of stuck.

Also, according to the present embodiment, the filling member 270 may include at least one slit 279 that is provided to penetrate in the radial direction behind the backup protrusion 277, for example, behind the transmission direction of the force. When the stopper projection 258 of the spindle member 252 and the backup protrusion 277 of the filling member 270 engage with each other, self-locking can be realized by increasing the coupling force or tightening force between the nut member 254 and the spindle member 252 while decreasing by the gap of the slit 279. Further, at the moment when the stopper projection 258 and the backup protrusion 277 are engaged with each other, the clearance is reduced by the gap of the slit 279, and the load applied to the backup protrusion 277 and the filling member 270 is buffered, thereby improving the durability of the product.

Figure 10:
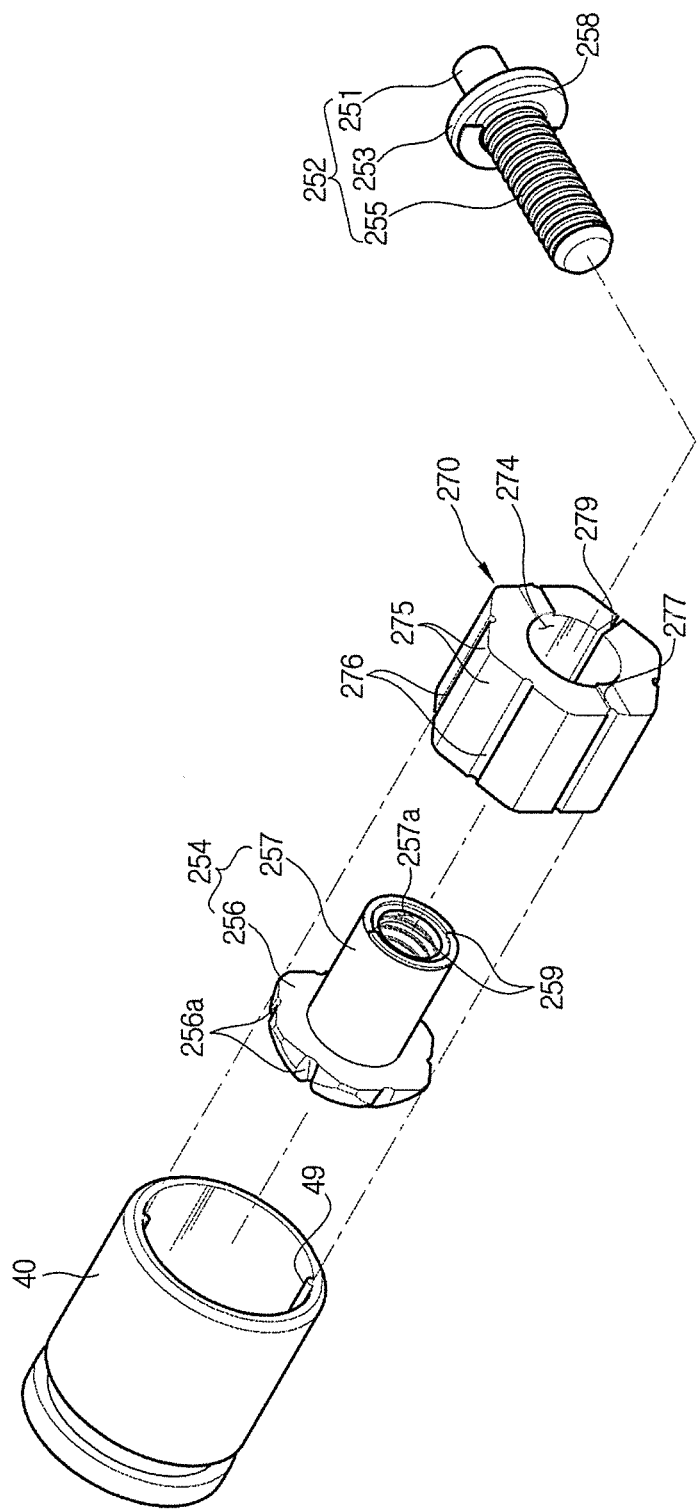
FIG. 10 is an exploded view of a piston, a power converting unit, and a filling member provided in an electric caliper brake according to another embodiment of the present disclosure.

FIG. 10 is an exploded view of a piston, a power converting unit, and a filling member provided in an electric caliper brake according to another embodiment of the present disclosure. The present embodiment will be described mainly on the points different from the above embodiments, and the same reference numerals denote the same functions, and thus a detailed description thereof will be omitted.

Air may be contained in the brake fluid when the braking fluid flows into the cylinder 31 during assembly of the component elements or through the oil port 39. The presence of air in the brake fluid affects not only the fine braking operation but also the durability of the product.

Accordingly, the filling member 270 according to another embodiment of the present disclosure may be provided with first slots 276 extending in the longitudinal direction or the axial direction of the piston 40 on the outer circumferential surface, and the head portion 256 of the nut member 254 may be provided with second slots 256a extending in the same direction.

The first slots 276 and the second slots 256a may be formed in such a manner that an outer circumferential surface of the filling member 260 and a portion of the outer surface of the head portion 256 are recessed, respectively, and thus the air present in the brake fluid inside the piston 40 can be discharged to the outside through the first slots 276 and the second slots 256a. The first slots 276 and the second slots 256a extend in the same direction to each other for smooth air discharge and are arranged such that the contact portions of the first slots 276 and the second slots 256a coincide with each other so that the first slots 276 and the second slots 256a can be connected to each other. Further, the outer diameter of the filling member 260 and the outer diameter of the head portion 256 of the nut member 254 may be provided to be equal to each other in order to effectively discharge the air present in the brake fluid, and thus the slot 276s and the second slots 256a can be easily connected.

The inner circumferential surface of the piston 40 may be provided with anti-rotation protrusions 49 in order to prevent the filling member 270 and the nut member 254 from rotating.

The anti-rotation protrusions 49 may be formed to protrude from the inner circumferential surface of the piston 40 so that the first slots 276 provided on the outer circumferential surface of the filling member 270 and the second slots 256a provided on the head portion 256 of the nut member 254 can enter therethrough. The anti-rotation protrusions 49 may be formed to extend along the moving direction of the filling member 270 and the nut member 254 on the inner peripheral surface of the piston 40.

Since the filling member 270 and the nut member 254 are disposed in the interior of the piston 40 with the anti-rotation protrusions 49 inserted into the first slots 276 and the second slots 256a, the filling member 270 and the nut member 254 can convert the rotational motion of the spindle member 152 into a linear motion in a limited rotation state.

FIG. 10 illustrates that six first slots 276 and a second slot 256a are provided on the filling member 270 and the outer surface of the head portion 256 of the nut member 254, respectively, and two anti-rotation protrusions 49 are formed on the inner peripheral surface of the piston 40, but it is to be understood that the present disclosure is not limited to the above-described structure and number. If the air of the brake fluid can be easily discharged through the first slots 276 and the second slots 256a while limiting the rotation of the filling member 270 and the nut member 254, the first slots 276, the second slots 256a, and the anti-rotation protrusions 49 may be varied.

As in apparent from the above description, in the electric caliper brake according to the embodiment of the present disclosure, the rotation of the spindle member with respect to the piston can be restricted by the anti-rotation member formed integrally with the nut member through the insert injection. The anti-rotation member can be made of a lightweight material, the weight of the nut member can be reduced and the protrusion portion provided for preventing the rotation of the head portion of the conventional steel nut member becomes unnecessary, so that the ease of machining can be ensured. Further, since the anti-rotation member receives the supporting force against the rotational force as a whole, the durability of the parts can be improved by dispersing the torque applied only to the conventional portion (head portion).

In addition, the electric caliper brake according to the embodiment of the present disclosure can improve the braking feeling by increasing pedal pressure by providing a filling member in the empty space of the piston to reduce the required fluid amount of the brake oil.

Further, in the electric caliper brake according to the embodiment of the present disclosure, the stepped portion and the backup protrusion are provided on the nut member and the filling member, respectively, and the stepped portion and the backup protrusion can be stably engaged with the stopper projection of the spindle member, to effectively operate within the effective stroke.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electric caliper brake which comprises a carrier provided with a pair of pad plates movably with respect to a disk, and a caliper housing slidably installed on the carrier and provided with a cylinder in which a piston is movably provided by braking oil pressure, comprising:
   a spindle member which is installed to penetrate a rear portion of the cylinder and rotates by receiving a rotational force from an actuator, and a power converting unit including a nut member which is screwed with the spindle member and is disposed in the piston, moves forward and backward in accordance with the rotation of the spindle member so as to press the piston;
   a filling member coupled to the nut member in the piston;
   an anti-rotation surface provided on at least one plane on an outer circumferential surface of the filling member so that the filling member is coupled to the piston in a limited rotation state;
   a stopper projection provided on the spindle member facing the nut member;
   a stepped portion provided on the nut member so as to be engaged with the stopper projection when the stopper projection is rotated; and
   a backup protrusion provided on the filling member so as to be engaged with the stopper projection when the stopper projection is rotated,
   wherein the stepped portion and the backup protrusion facing the stopper projection are disposed at different angles so as to be engaged with each other when the stopper projection is rotated, and
   wherein the height of the backup protrusion protruding from the filling member is provided to be the same as the height of the stepped portion protruding from the nut member.

2. The electric caliper brake according to claim 1, wherein the nut member comprises a rod portion provided with thread for screwing to the spindle member and a head portion extending radially from the rod portion,
   the filling member is integrally formed with the nut member,
   at least one rotation preventing portion having a plane surface is formed on an inner circumferential surface of the piston, and
   the head portion is formed so as not to be in contact with the rotation preventing portion.

3. The electric caliper brake according to claim 2, wherein the filling member is formed to be in close contact with the rear side of the head portion to enclose the rod portion.

4. The electric caliper brake according to claim 2, wherein the anti-rotation surface is in surface contact with the rotation preventing portions having a plane surface formed on an inner circumferential surface of the piston.

5. The electric caliper brake according to claim 1, wherein the filling member is formed of aluminum or a plastic material.

6. The electric caliper brake according to claim 5, wherein the outer diameter of the head portion is provided to be smaller than the outer diameter of the filling member.

7. The electric caliper brake according to claim 1, wherein the filling member is formed of an incompressible material.

8. The electric caliper brake according to claim 1, wherein the nut member comprises a head portion that is in contact with the piston, and a nut rod portion extending from the head portion and is threaded on an inner circumferential surface to be screwed with the spindle member, and the filling member has a hollow portion at its center, and the nut rod portion is coupled to the hollow portion.

9. The electric caliper brake according to claim 1, wherein the filling member includes at least one slit formed in a radial direction.

10. An electric caliper brake which comprises a carrier provided with a pair of pad plates movably with respect to a disk, and a caliper housing slidably installed on the carrier and provided with a cylinder in which a piston is movably provided by braking oil pressure, comprising:

a spindle member which is installed to penetrate a rear portion of the cylinder and rotates by receiving a rotational force from an actuator, and a power converting unit including a nut member which is screwed with the spindle member and is disposed in the piston, moves forward and backward in accordance with the rotation of the spindle member so as to press the piston; and a filling member coupled to the nut member in the piston, wherein a plurality of first slots for discharging air present in the cylinder are provided on the outer surface of the filling member, the nut member further comprises a head portion that is in contact with the piston, and a nut rod portion that extends from the head portion and is threaded on an inner circumferential surface to be screwed with the spindle member, and a plurality of second slots extending in a direction parallel to the axial direction of the piston to discharge air present in the cylinder are provided on the outer surface of the head portion.

11. The electric caliper brake according to claim 10, wherein at least one anti-rotation protrusion is provided on the inner circumferential surface of the piston so as to be able to be inserted into the first slots and the second slots.

* * * * *